US012264066B2

(12) United States Patent
Richardson et al.

(10) Patent No.: US 12,264,066 B2
(45) Date of Patent: Apr. 1, 2025

(54) PROCESS AND APPARATUS FOR ACID REGENERATION

(71) Applicant: Messer Industries USA, Inc., Bridgewater, NJ (US)

(72) Inventors: Andrew Richardson, Clinton, NJ (US); Frank Fitch, Bedminster, NJ (US); Blake Stapper, Austin, TX (US)

(73) Assignee: Messer Industries USA, Inc., New Castle, DE (US)

( * ) Notice: Subject to any disclaimer, the term of this patent is extended or adjusted under 35 U.S.C. 154(b) by 478 days.

(21) Appl. No.: 17/727,870

(22) Filed: Apr. 25, 2022

(65) Prior Publication Data

US 2023/0339752 A1    Oct. 26, 2023

(51) Int. Cl.
| | | |
|---|---|---|
| C01B 17/58 | (2006.01) |
| F23G 5/08 | (2006.01) |
| F23G 7/00 | (2006.01) |
| F23L 7/00 | (2006.01) |
| F23L 15/00 | (2006.01) |
| F23N 5/00 | (2006.01) |

(52) U.S. Cl.
CPC ............ C01B 17/58 (2013.01); F23G 5/08 (2013.01); F23G 7/008 (2013.01); F23L 7/007 (2013.01); F23L 15/00 (2013.01); F23N 5/006 (2013.01); *F23G 2204/10* (2013.01); *F23L 2900/07005* (2013.01); *F23L 2900/07006* (2013.01)

(58) Field of Classification Search
CPC ......... C01B 17/58; C01B 17/508; F23G 5/08; F23G 7/008; F23G 2204/10; F23L 7/007; F23L 15/00; F23L 2900/07005; F23L 2900/07006; F23N 5/006
See application file for complete search history.

(56) References Cited

U.S. PATENT DOCUMENTS

| | | | |
|---|---|---|---|
| 2,406,930 A | 9/1946 | Titlestad |
| 4,046,866 A | 9/1977 | Hurlburt et al. |
| 4,376,107 A | 3/1983 | Morgenthaler |
| 4,490,347 A | 12/1984 | Gelblum |
| 4,748,919 A | 6/1988 | Campobenedetto et al. |
| 5,022,332 A | 6/1991 | Ding |

(Continued)

FOREIGN PATENT DOCUMENTS

| | | | |
|---|---|---|---|
| CN | 104876190 A | | 9/2015 |
| CN | 110894064 A | * | 3/2020 |

(Continued)

OTHER PUBLICATIONS

PCT International Search Report from ISA/US for PCT/US2022/81734 filed Dec. 16, 2022, Date of Mailing: May 3, 2023, Authorized Officer: Kari Rodriquez, 7 pgs.

PCT Written Opinion from ISA/US for PCT/US2022/81734 filed Dec. 16, 2022, Date of Mailing: May 3, 2023, Authorized Officer: Kari Rodriquez, 8 pgs.

(Continued)

*Primary Examiner* — Daniel C. McCracken
*Assistant Examiner* — Joshua Maxwell Speer
(74) *Attorney, Agent, or Firm* — Joshua L. Cohen

(57) ABSTRACT

A process and apparatus for regenerating a spent acid stream or other stream, such as a spent acid stream or other stream containing sulfur, by decomposing the spent sulfuric acid stream and/or other sulfur-containing streams to recover sulfur dioxide from the stream. Also provided is a process for preparing sulfuric acid from the sulfur dioxide recovered by the apparatus and process.

12 Claims, 1 Drawing Sheet

(56) References Cited

U.S. PATENT DOCUMENTS

| | | | |
|---|---|---|---|
| 5,498,790 A | 3/1996 | Grendel et al. | |
| 5,531,169 A * | 7/1996 | Mole | F23G 7/008 |
| | | | 110/238 |
| 6,399,040 B1 | 6/2002 | Daft et al. | |
| 6,572,835 B1 | 6/2003 | MacArthur et al. | |
| 6,979,430 B2 | 12/2005 | Fan et al. | |
| 10,829,376 B2 | 11/2020 | Lykke et al. | |
| 10,995,949 B2 | 5/2021 | Schreiner et al. | |
| 2008/0063593 A1 | 3/2008 | Smith et al. | |
| 2008/0145290 A1 | 6/2008 | Daum et al. | |
| 2008/0226540 A1 | 9/2008 | Felthouse et al. | |
| 2009/0068088 A1 | 3/2009 | Daum et al. | |
| 2009/0226353 A1 | 9/2009 | Tekie et al. | |
| 2009/0226362 A1 | 9/2009 | Randolph, III et al. | |
| 2009/0317321 A1 | 12/2009 | Meagher et al. | |
| 2010/0092374 A1 | 4/2010 | Erkes et al. | |
| 2010/0284899 A1 | 11/2010 | Kita et al. | |
| 2013/0028821 A1 | 1/2013 | Suchak | |
| 2014/0294719 A1 | 10/2014 | Schreiner | |
| 2019/0152780 A1 | 5/2019 | O'Connell | |
| 2020/0182459 A1* | 6/2020 | Schreiner | F23D 14/32 |
| 2020/0280058 A1 | 9/2020 | Shen et al. | |
| 2021/0147234 A1 | 5/2021 | Daum et al. | |
| 2022/0227625 A1 | 7/2022 | Thellefsen et al. | |

FOREIGN PATENT DOCUMENTS

| | | | |
|---|---|---|---|
| EP | 0091679 A1 | 10/1983 | |
| EP | 0972746 A1 | 1/2000 | |
| GB | 1527661 A1 | 10/1978 | |
| GB | 1602621 A1 | 11/1981 | |
| WO | 2022053176 A1 | 3/2022 | |
| WO | 2022083737 A1 | 4/2022 | |

OTHER PUBLICATIONS

PCT International Search Report from PCT/US2023/019561 filed Apr. 24, 2023, Date of Mailing: Aug. 15, 2023, Authorized Officer: Kari Rodriquez, 8 pgs.

PCT International Written Opinion from PCT/US2023/019561 filed Apr. 24, 2023, Date of Mailing: Aug. 15, 2023, Authorized Officer: Kari Rodriquez, 6 pgs.

PCT International Search Report from ISA/US for PCT/US2023/19558 filed Apr. 24, 2023, Date of Mailing: Sep. 27, 2023, Authorized Officer: Kari Rodriquez, 12 pgs.

PCT Written Opinion from ISA/US for PCT/US2023/19558 filed Apr. 24, 2023, Date of Mailing: Sep. 27, 2023, Authorized Officer: Kari Rodriquez, 12 pgs.

International Preliminary Report on Patentability for PCT/US2022/081734, Date of Mailing: Nov. 7, 2024, Authorized Officer: Agnes Wittmann-Regis, 10 pages.

PCT International Search Report from ISA/US for PCT/US2023/19522 filed Apr. 24, 2023, Date of Mailing: Sep. 13, 2023, Authorized Officer: Kari Rodriquez, 9 pgs.

PCT Written Opinion from ISA/US for PCT/US2023/19522 filed Apr. 24, 2023, Date of Mailing: Sep. 13, 2023, Authorized Officer: Kari Rodriquez, 11 pgs.

PCT International Search Report from ISA/US for PCT/US2023/19530 filed Apr. 24, 2023, Date of Mailing: Sep. 21, 2023, Authorized Officer: Kari Rodriquez, 10 pgs.

PCT Written Opinion from ISA/US for PCT/US2023/19530 filed Apr. 24, 2023, Date of Mailing: Sep. 21, 2023, Authorized Officer: Kari Rodriquez, 9 pgs.

Abumounshar, Najah Mahmoud et al., A Detailed Reaction Mechanism for Elemental Sulphur Combustion in the Furnace of Sulphuric Acid Plants, The Canadian Journal of Chemical Engineering, Dec. 23, 2020, pp. 1-11, Canada.

* cited by examiner

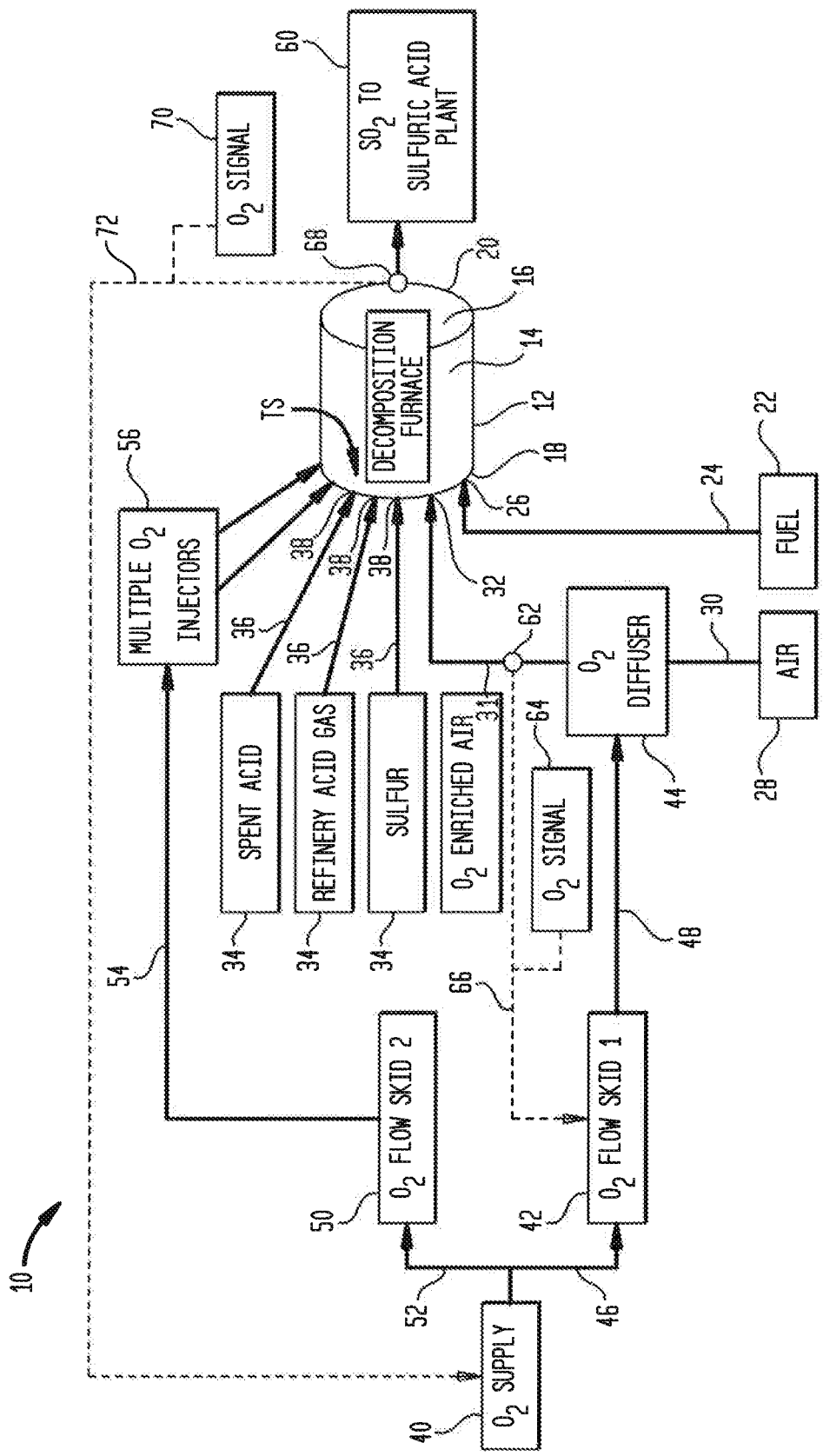

PROCESS AND APPARATUS FOR ACID REGENERATION

TECHNICAL FIELD

The present embodiments relate to a method and apparatus for regenerating a spent acid stream or a precursor-containing stream. Illustrative embodiments relate to a method and apparatus for preparing sulfur dioxide from a spent sulfuric acid stream or other sulfur-containing streams.

BACKGROUND

Spent sulfuric acid streams and other sulfur-containing streams may be recovered in a single-stage spent acid decomposition furnace to produce sulfur dioxide, which, in turn, may be used for the purpose of producing pure sulfuric acid.

A single-stage spent acid decomposition furnace operating at full capacity is limited by a number of operating constraints, including the pressure drop through the furnace, the furnace exit gas temperature, and the furnace NOx emissions.

Known processes have proposed to add supplemental oxygen to the combustion air to allow for oxidation of more spent sulfuric acid and other sulfur-containing compounds in the decomposition furnace, producing more sulfur dioxide which is the feedstock to prepare pure sulfuric acid.

The addition of supplemental oxygen to the decomposition furnace to oxidize greater amounts of sulfur-containing compounds reduces the concentration of nitrogen in the furnace, making the flame more compact and causing the peak flame temperature to increase, resulting in greater nitrogen and oxygen dissociation and increases in hydroxyl radical concentrations which lead to higher NOx emissions. Simply adding oxygen to the combustion air will also increase the volumetric flow rate through the furnace, causing an unacceptable increase in the pressure drop across the furnace.

Therefore, there is a need in the art to increase the capacity of the furnace to recover more spent acid and/or produce more sulfur dioxide without exceeding the operating constraints, and to overcome the above described disadvantages.

SUMMARY

According to a first illustrative embodiment, provided is a process for decomposing at least one of a spent sulfuric acid stream or other sulfur-containing stream comprising: supplying at least one of the spent sulfuric acid stream or the other sulfur-containing stream into a furnace; supplying oxygen-enriched combustion air into the furnace; supplying pure oxygen into the furnace; and oxidizing the at least one of the spent sulfuric acid stream or other sulfur-containing stream in the furnace.

According to a second illustrative embodiment, provided is an apparatus for decomposing at least one of a spent sulfuric acid feed or sulfur-containing feed comprising: a decomposition furnace; an inlet for supplying at least one of a spent sulfuric acid stream or sulfur-containing stream into the decomposition furnace; an inlet for supplying an oxygen-enriched combustion air stream into the decomposition furnace; an inlet for supplying a pure oxygen stream into the decomposition furnace separately from the oxygen-enriched combustion air stream; and an inlet for supplying a combustion fuel stream to the decomposition furnace.

According to a third illustrative embodiment, provided is a process for preparing sulfuric acid from at least one of a decomposed spent sulfuric acid stream or other sulfur-containing stream comprising: supplying at least one of the spent sulfuric acid stream or the other sulfur-containing stream to a furnace; supplying oxygen-enriched combustion air into the furnace; separately supplying pure oxygen into the furnace; oxidizing the at least one of spent sulfuric acid stream or other sulfur-containing stream in the furnace to sulfur dioxide; and converting the sulfur dioxide to sulfuric acid.

BRIEF DESCRIPTION OF THE DRAWINGS

For a more complete understanding of the present embodiments, reference may be had to the following description of exemplary embodiments considered in connection with the accompanying drawing FIGURE, of which:

The FIGURE is a schematic view of the present process and apparatus embodiments for decomposing a spent sulfuric acid stream or other sulfur-containing stream.

DETAILED DESCRIPTION OF THE ILLUSTRATIVE EMBODIMENTS

Before explaining the inventive embodiments in detail, it is to be understood that the invention is not limited in its application to the details of construction and arrangement of parts illustrated in the accompanying drawings, if any, since the invention is capable of other embodiments and being practiced or carried out in various ways. Also, it is to be understood that the phraseology or terminology employed herein is for the purpose of description and not of limitation.

In the following description, terms such as a horizontal, upright, vertical, above, below, beneath and the like, are to be used solely for the purpose of clarity illustrating the invention and should not be taken as words of limitation. The drawings are for the purpose of illustrating the invention and are not intended to be to scale.

Disclosed is a process for decomposing a spent acid stream or other acid precursor-containing stream. The process comprises supplying at least one of a spent acid stream or other acid-precursor stream into a furnace suitable for oxidizing the spent acid stream or other acid precursor-containing feed. The process comprises supplying an oxygen-enriched combustion air stream into the furnace and separately supplying a pure oxygen stream into the furnace. The process further comprises oxidizing at least a portion of the spent acid stream or other acid precursor-containing stream supplied to the furnace.

According to certain illustrative embodiments, the process is directed to decomposing a spent sulfuric acid stream and/or the sulfur-containing stream. The processes disclosed herein increase the production capacity of a decomposition furnace to product sulfuric dioxide from at least one of the spent sulfuric acid stream or other sulfur-containing stream, without increasing the pressure drop within furnace, the volumetric flow rate of the decomposition furnace, the exit gas temperature of the decomposition furnace, and/or the NOx emissions from the decomposition furnace.

The process comprises supplying at least one of a spent sulfuric acid stream or other sulfur-containing stream into a decomposition furnace suitable for oxidizing the spent sulfuric acid stream and/or other sulfur-containing stream to sulfur dioxide. The other sulfur-containing streams that may be used in the process may comprise, for example, and without limitation, a stream of elemental sulfur, a stream of a sulfur-containing compound, or a sulfur-containing refinery acid gas. The process comprises supplying an oxygen-enriched combustion air stream into the furnace and separately supplying a pure oxygen stream into the furnace. The process further comprises oxidizing at least a portion of the spent sulfuric acid stream supplied to the furnace to sulfur dioxide.

According to other illustrative embodiments, the process is directed to decomposing a sulfur-containing stream, other than a spent sulfuric acid stream. The process comprises supplying the sulfur-containing stream into a furnace suitable for oxidizing the sulfur-containing stream. The process comprises supplying an oxygen-enriched combustion air stream into the furnace and separately supplying a pure oxygen stream into the furnace. The process further comprises oxidizing at least a portion of the sulfur-containing stream supplied to the furnace.

The combustion air stream accounts for a significant fraction of the mass entering the furnace and is the primary source of the nitrogen that is oxidized to form thermal NOx. Because the combustion air is primarily made of nitrogen, it is possible to offset some of the ambient air with pure oxygen so the process requires less total mass of oxygen and combustion air to achieve complete combustion in the furnace. The replacement of a sufficient mass of the combustion air with oxygen results in an increase in the capacity of the furnace to oxidize sulfur-containing compounds without increasing the total mass flow rate.

According to certain embodiments, the disclosed process provides first and second oxygen enrichments to a furnace. According to the disclosed process, the first oxygen enrichment comprises replacing a portion of the combustion air with oxygen to provide at least one oxygen-enriched combustion air stream that is supplied to the decomposition furnace. The second oxygen enrichment comprises at least one pure oxygen stream that is supplied to the furnace separately from at least one oxygen-enrichment combustion air stream. According to certain embodiments, the disclosed process may split the overall oxygen enrichment into separate parts, so that at least a portion of the second oxygen enrichment is injected directly into the decomposition furnace at the periphery of the primary flame zone.

According to certain embodiments, the disclosed process may reduce the combustion air flow, the combustion air is not enhanced with oxygen, and all of the supplemental oxygen enrichment is injected directly into the furnace. This creates a larger, cooler primary flame zone that allows for more air to be replaced with pure oxygen, and results in the furnace's capacity for oxidizing a greater amount of sulfur-containing compounds without increasing pressure drop, furnace exit gas temperature, or NOx emissions.

While preheated combustion air is typically fed into the furnace burners and provides a relatively inobtrusive means to introduce oxygen into the furnace, the present inventors have learned that it is not the ideal location to introduce all the oxygen. The adiabatic flame temperature of an enhanced oxygen flame is higher than that for combustion with air and therefore, introducing all of the oxygen-enriched combustion air through the burners will result in a primary flame zone that is hotter than before. This would result in increased rates of thermal NOx formation, and potentially a higher furnace exit gas temperature.

According to certain illustrative embodiments of the presently disclosed process, at least a portion of the oxygen supplied to the furnace is delivered or otherwise targeted at the edges of the primary flame zone to allow for the oxidation of sulfur-containing compounds to occur in a larger flame zone with a more uniform temperature profile. According to the presently disclosed process, the supply of oxygen in this targeted manner reduces the volume of the flame zone that occurs at peak flame temperatures and the rate at which thermal NOx is formed and emitted from the furnace.

Not all of the oxygen must be supplied to the furnace through the burners and excessive oxygen concentrations could lead to locally elevated temperatures. According to certain illustrative embodiments, the process controls the split of oxygen between general oxygen enrichment in the combustion air stream that is delivered to the furnace burners, and the targeted oxygen enrichment that comprises injection of pure oxygen at or near the periphery of the primary flame to control combustion and process conditions. The process step of supplying at least a portion of the oxygen targeted at the edges or periphery of the primary flame zone within the furnace allows a higher oxygen concentration spread across a larger volume than could be achieved by the supply of combustion air to the burners alone, thereby resulting in a flame zone that occupies a larger volume with a lower peak temperature.

The apparatus and process provide for two separate feeds of oxygen into the furnace at separate injection locations. One of the two oxygen feeds is fed into the furnace (this may be referred to as the robust oxygen injector), and the other of the two oxygen feeds is fed into a conduit or pipe carrying the combustion air to the furnace (this may be referred to as the diffuse oxygen injector) to mix with the combustion air to provide an oxygen enriched combustion air. According to certain embodiments, this oxygen feed may be fed into either a combustion air pre-heater inlet duct or outlet duct in order to mix the oxygen enrichment with the combustion air.

According to certain embodiments, the initial target of how the total additional oxygen supplied is split between the oxygen-enriched combustion air and the targeted enrichment is to only supply the required oxygen in the oxygen-enriched combustion air to maintain the adiabatic flame temperature and/or burner stoichiometric ratio.

The total oxygen flow to the apparatus is determined to deliver the required available heat and chemical reaction in the apparatus through a mass and energy balance while maintaining the volume of the products of combustion below a maximum value determined by the maximum pressure dropped through the system.

The process provides controlled supply of oxygen to the decomposition furnace between general oxygen enrichment of the combustion air supply of burners firing into the decomposition furnace and direct oxygen injection into the decomposition furnace. The total oxygen flow to the system is determined to limit the off-gas volumes while maintaining exhaust gas oxygen concentrations and temperatures for varying feed stream flow and compositions.

Without the replacement of some of the combustion air by use of supplemental oxygen enrichment at higher feed rates, the volumetric flow of off-gas rises and the residence time in the furnace available for reactions is reduced because of the following mechanisms:

Increased volume of sulfur and acid decomposition products; and

Higher fuel flows and thus higher air and higher combustion product flows to maintain furnace exhaust temperatures.

This leads to the following effects:

Higher loads on the off-gas system. For example, the induced draft fan, which draws air into and combustion products through the decomposition furnace while maintaining a negative furnace pressure, is often a limit.

Higher amount of combustion air being needed, coming from the suction of the induced draft fan together with the forced draft fans blowing air into the burners.

Increased velocity through the system and reduced residence time for reactions could lead to poor decomposition.

Oxygen supplementation can relieve or improve these effects. Decomposition furnaces may be driven stoichiometrically by off-gas oxygen measurements. By supplementing the combustion air with oxygen, the combustion air flow is reduced accordingly by the production plant automation system to maintain the desired off-gas residual oxygen concentration. This results in a lowered amount of ballast nitrogen in the combustion oxidizer (mix of combustion air and oxygen) and off-gas (lowering the load on both induced draft and forced draft fans) and an increased residence time at a fixed acid feed rate.

It is known that oxygen enrichment of the combustion air at a constant stoichiometry raises the flame and combustion product temperatures which has an adverse effect on NOx formation and can be deleterious to the furnace refractory life. For these reasons the presently disclosed process supplies at least some of the oxygen through direct pure oxygen injectors into the decomposition furnace, targeted proximate the flames emanating from the burners with the balance of the oxygen as an oxygen-enriched combustion air stream to augment the combustion. As some of the total oxygen supplied is not introduced through the enriched combustion air and the amount of air has been reduced to maintain the overall furnace exhaust oxygen concentration, the stoichiometry of the burners and flame will fall or be reduced. As the stoichiometric condition is approached and passed, this has the effect of increasing and then reducing the flame temperature and radical concentrations (i.e., O, N and OH) important in the formation of NOx.

The directly injected oxygen stream(s) is introduced into the decomposition furnace through at least one high velocity, preferably sonic, nozzles to produce high velocity oxygen jets proximate the burner flames, spent sulfuric acid, and sulfur jets. The high velocity oxygen jets entrain and mix with hot furnace atmosphere that contains reacted and partially unreacted combustibles and causes their oxidation in a diffuse manner. Such diffuse oxidation reactions avoid the peak flame temperatures seen in conventional combustion that drive NOx formation and distribute the overall reactions over a larger region than in the confluence zone of the main burners. As such, it is desired to be able to control the split or separation of oxygen from general enrichment of combustion air to that of direct oxygen injection to be able to control combustion and related process conditions.

According to certain illustrative embodiments, the oxygen enrichment supplied to the decomposition furnace is provided only by one or more steams of oxygen that are supplied to the furnace separate from the combustion air stream, and the combustion air stream is not enriched with oxygen. Accordingly, this embodiment provides a process for regenerating a spent sulfuric acid stream or other sulfur-containing stream comprising: supplying at least one of the spent sulfuric acid stream or the other sulfur-containing stream into a furnace, supplying combustion air into the furnace, supplying pure oxygen into the furnace separate from the combustion air, and oxidizing at least one of the spent sulfuric acid stream or other sulfur-containing stream in the furnace.

The apparatus includes a controller to control a plurality of flows (two flows, for example) of oxygen to at least two separate locations: at least one general enrichment stream to at least one burner and at least one injection stream for direct injection into the furnace. A flow train of the controller provides basic safety functions, including automatic oxygen shut-off valves activated by excessive process deviations such as pressures, flows, temperatures, process interlocks and emergency stops. To modulate and measure the flows, the flow train also includes inlet pressure regulation, flow meters and flow control valves connected to the controller.

A temperature sensing "TS" element, such as a thermocouple or a pyrometer, is preferably located in the front region of the decomposition furnace, approximately in line with a zone accommodating the flames produced by the burners. This temperature is representative of excessively low or high temperatures experienced within the flame zone. A temperature setpoint within a temperature range is determined by previous satisfactory operation. The proportion of the total oxygen delivered to the system and which is delivered through the general enrichment system is responsive to the deviation from a desired temperature set point, i.e., if the temperature TS is too low then the proportion of oxygen delivered to the enriched air is increased; if the temperature TS is too high then the proportion of oxygen delivered to the enriched air is reduced. In this way of construction and operation, during instances of changes in throughput, or composition changes to the feed streams, the split of oxygen supplied through direct injection and the general enrichment of the combustion air will modulate to maintain the desired operating temperature window and reduce NOx emissions.

Pressure transmitters can be positioned immediately upstream of each oxygen injector, sparger or diffuser used for general enrichment of the combustion air and injectors for direct oxygen injection. The outputs of pressure transmitters are continuously monitored together with flow rate to determine any deviation from intended and historic values which would indicate a blockage, wear or failure in the enrichment or injection system.

The controller is in communication with the oxygen flow control of the flow train, and the temperature sensor TS. The controller or control routine is in communication with the temperature sensor TS, flow meters and control valves of the oxygen flowtrain. The controller maintains the total oxygen flow at the desired oxygen flow set point and determines the actual flows to each location (at least one for the general enrichment, and at least one for the direct injection) based on the temperature deviation between the temperature indicated by TS and the desired combustion zone setpoint temperature. As the temperature at TS falls below the setpoint temperature, the controller instructs oxygen flow train control valves to deliver a greater oxygen flow to the general enrichment diffuser or sparger and less to direct oxygen injector, thereby maintaining a constant total oxygen flow at the desired total oxygen flow setpoint. Conversely, if the temperature at TS rises above the setpoint temperature range, the controller instructs the oxygen flow train control valves to deliver a smaller oxygen flow to the general enrichment diffuser or sparger and a greater oxygen flow to the direct oxygen injector, thereby maintaining a constant total oxygen flow at the desired total oxygen flow setpoint. According to certain embodiments, a range or dead band is a range in which the controller takes no action, i.e., the controller only makes a change when the temperature exits only the dead band range around the desired setpoint in control so as to prevent frequent flow changes for only small temperature deviations. Such control functions are readily achievable with known industrial controllers such a programmable-logic-controllers (PLC), distributed control systems (DCS) or microprocessor-based controls incorporating functions such as proportional-integral-derivative (PID) loop, on-off and dead-band functions.

According to certain embodiments, an oxygen analyzer may be located at the furnace outlet to maintain a target level of excess oxygen in the exhaust, and the total oxygen flow to the apparatus is adjusted to maintain the target.

A spent acid stream is fed into the furnace through an inlet formed in the wall of the furnace that is in fluid communication with a conduit carrying the spent acid stream.

According to certain illustrative embodiments, at least one of the spent acid stream, the oxygen-enriched combustion air stream, or the pure oxygen stream may be pre-heated prior to introducing the stream into the decomposition furnace. The pre-heating of one or more of the spent acid stream, the oxygen-enriched combustion air stream, or the pure oxygen stream may be carried out by indirectly heating the conduit(s) or pipe(s) supplying the one or more streams to the decomposition furnace. According to certain illustrative embodiments, none of the spent acid stream, the oxygen-enriched combustion air stream, or the pure oxygen stream are pre-heated before they are supplied into the interior of the decomposition furnace.

According to other illustrative embodiments, the spent acid stream may be pre-heated prior to introducing the spent acid stream into the decomposition furnace. For example, and without limitation, the spent acid stream may be indirectly heated by a suitable heater prior to introducing the stream into the furnace while this stream is being supplied through a suitable conduit.

According to other illustrative embodiments, the oxygen-enriched combustion air stream may be pre-heated prior to introducing the oxygen-enriched combustion air stream into the decomposition furnace. For example, and without limitation, the oxygen-enriched combustion air stream may be indirectly heated by a suitable heater prior to introducing the stream into the furnace while this stream is being supplied through a suitable conduit. According to other illustrative embodiments, the oxygen enrichment may be added to the combustion air after the combustion air has been pre-heated, thereby resulting in a pre-heated oxygen-enriched combustion air stream.

According to other illustrative embodiments, the pure oxygen stream may be pre-heated prior to introducing the pure oxygen stream into the decomposition furnace. For example, and without limitation, the pure oxygen stream may be indirectly heated by a suitable heater prior to introducing the stream into the furnace while this stream is being supplied through a suitable conduit.

According to certain illustrative embodiments, the temperature of the oxygen-enriched combustion air stream that is supplied to the decomposition furnace is preheated to a temperature from about 20° C. to about 750° C., or from about 400° C. to about 750° C., or from about 600 to about 700° C.

According to certain illustrative embodiments, the exit gas temperature of the decomposition furnace is from about 900° C. to about 1,200° C., or from about 960° C. to about 1,100° C., or from about 1,000 to about 1,060° C.

According to certain illustrative embodiments, the percent oxygen present in the oxygen-enriched combustion air stream supplied to the decomposition furnace is from about 20.9% to about 30% (volume percent or "v/v"), or from about 20.9% to about 26% v/v, or from about 20.9% to about 23.5% v/v.

According to certain illustrative embodiments, the residence time of the spent acid stream in the decomposition furnace is from about 1.0 second to about 4.0 seconds, or from about 1.5 seconds to about 3.0 seconds, or from about 1.75 seconds to about 2.5 seconds.

According to certain illustrative embodiments, the total percent oxygen delivered to the furnace by the combination of the oxygen-enhanced combustion air stream and the pure oxygen stream(s) is from about 21% to about 40% v/v, or from about 25% to about 35% v/v, or from about 28% to about 32% v/v.

According to certain illustrative embodiments, the percent oxygen present in the furnace exhaust stream is from about 0.5% to about 4% v/v, or from about 1.0% to about 2.5% v/v, or from about 1.5% to about 2.2% v/v.

The apparatus for regenerating a spent acid feed or other acid precursor-containing feed comprises a decomposition furnace having an outer housing with an interior having an inner volume. The housing includes a plurality of inlets for feeding the various gas streams required by the regeneration process into the interior of the furnace. The apparatus includes at least one inlet for feeding each of combustion fuel, oxygen-enriched combustion air, pure oxygen, spent sulfuric acid stream, elemental sulfur stream, or other sulfur-containing stream into the interior of the furnace. The apparatus includes separate inlets for separately feeding or otherwise supplying oxygen-enriched combustion air and pure oxygen into the interior of the furnace.

The apparatus further comprises a supply of spent acid. The source of spent acid stream is in fluid communication with the interior of the furnace. The apparatus includes an inlet for supplying a spent acid feed into the decomposition furnace. A suitable heater may be positioned at any point between the source of the spent acid and the spent acid stream inlet of the furnace for preheating the spent acid stream before it is fed into the interior of the furnace.

The apparatus further comprises a source or supply of oxygen for use in the process. According to certain embodiments, the source of supply of oxygen may be divided or otherwise split to separately supply a portion of pure oxygen directly into the interior of the furnace and to supply pure oxygen to the combustion air to prepare an oxygen-enriched combustion air which is supplied to the interior the furnace.

According to certain embodiments, the apparatus includes suitable conduit or piping extending directly between, and in fluid communication with, the source or supply of oxygen and the interior of the furnace to feed a stream of oxygen gas directly into the interior of the furnace, independent of the supply of the oxygen-enriched combustion gas. The apparatus includes at least one inlet for supplying a pure oxygen feed into the decomposition furnace separately from the supplying of the oxygen-enriched combustion air. A suitable heater may be positioned at any point between the source of oxygen and the oxygen gas inlet of the furnace for preheating the oxygen gas before it is fed into the interior of the furnace.

The apparatus further comprises a supply of combustion air. The combustion air is supplied from the supply to the interior of the furnace by suitable conduits or piping that are in fluid communication between the supply of combustion air and the interior of the furnace. The apparatus includes at least one inlet for supplying a feed of an oxygen-enriched combustion air into the decomposition furnace.

The apparatus also includes a supply of oxygen that is in fluid communication with the conduits or piping carrying the combustion air from the supply of combustion air to the interior of the furnace. According to certain embodiments, the oxygen is supplied from a source or supply of oxygen directly into the conduit or piping carrying the combustion air from the source of combustion air to the furnace to prepare an oxygen-enriched combustion air.

According to other embodiments, the apparatus includes a heater for preheating the combustion air within the conduit or piping carrying the combustion air from the supply of combustion air into the furnace. According to these embodiments, the pure oxygen may be carried in suitable conduits or piping that are in fluid communication between the source of oxygen and the heater for preheating the combustion air. In this case, the pure oxygen may be fed directly into the heater for the combustion air where the oxygen is combined with the combustion air to prepare a heated oxygen-enriched combustion air that is then supplied to the furnace. According to other embodiments, the oxygen enrichment may be fed from the source of oxygen into conduits or piping carrying the combustion air at a location that is upstream or downstream from the combustion air heater.

The apparatus includes a suitable supply of combustion fuel. The combustion fuel is supplied from the supply to the interior of the furnace by suitable conduits or piping that are in fluid communication between the supply of combustion fuel and the interior of the furnace.

The combustion fuel feed may comprise a gaseous fuel selected from at least one of methane, natural gas, liquefied natural gas, propane, liquefied propane gas, butane, low BTU gases, town gas, producer gas, refinery fuel gas, hydrogen, carbon monoxide and mixtures thereof. According to other embodiments, the combustion fuel feed may comprise an atomized liquid fuel selected from at least one of heavy fuel oil, medium fuel oil, light fuel oil, kerosene, diesel and mixtures thereof. According to further embodiments, the combustion fuel feed may comprise a particulate solid fuel selected from at least one of coal, coke, petroleum coke, rubber, woodchips, sawdust, straw, biomass fuels and mixtures thereof suspended in a carrier gas stream delivered to the furnace. The carrier gas stream may be selected from at least one of air, nitrogen, carbon dioxide and a gaseous fuel, the gaseous fuel selected from at least one of methane, natural gas, liquefied natural gas, propane, liquefied propane gas, butane, low BTU gases, town gas, producer gas, hydrogen, carbon monoxide, and mixtures thereof.

The FIGURE is a diagrammatic view of an illustrative embodiment of the apparatus of the present disclosure. Apparatus 10 includes a decomposition furnace 12 having an outer housing 14 and an interior 16. The housing 14 of the furnace 12 includes an inlet side 18 and an outlet side 20. Inlet side 18 of housing 14 of furnace 12 includes a plurality of inlets leading into the interior 16 of the furnace 12 as described below to feed combustion fuel, spent acid streams, oxygen-enriched combustion air, and pure oxygen into the interior 16 of the furnace 12.

Apparatus 10 includes a source of combustion fuel 22. Suitable piping 24 extends between the source of combustion fuel 22 and the interior 16 of the furnace 12. The piping 24 is in fluid communication between the source of combustion fuel 22 and the combustion fuel inlet 26 leading to the interior 16 of the furnace 12 for supplying the combustion fuel to the interior 16 of the furnace 12.

Apparatus 10 includes a source of air 28 for combustion, i.e., the combustion air 28. Suitable piping 30 extends between the source of combustion air 28 and the interior 16 of the furnace 12. The piping 30 is in fluid communication between the source of combustion air 28 and the combustion air inlet 32 leading to the interior 16 of the furnace 12 for supplying the combustion air to the interior 16 of the furnace 12.

Apparatus 10 includes a source of spent acid 34 such as a spent sulfuric acid stream, refinery acid gas, and/or a sulfur stream. Suitable piping 36 extends between the source of the spent sulfuric acid 34 and the interior 16 of the furnace 12. The piping 36 is in fluid communication between the source of the spent sulfuric acid 34 and a corresponding spent sulfuric acid inlet 38 leading to the interior 16 of the furnace 12 for supplying the spent sulfuric acid to the interior 16 of the furnace 12.

Apparatus 10 also includes a source or supply of oxygen gas 40 providing oxygen to the combustion air 28 to prepare oxygen-enriched combustion air 31, and for providing a separate pure oxygen feed into the furnace 12 as described below. A first oxygen flow control means 42 (such as an oxygen flow skid 1) is positioned between, and is in fluid communication with, the source of oxygen 40 and the piping 30 carrying the combustion air 28 into the interior 16 of the furnace 12. The apparatus 10 may also include an oxygen diffuser means 44 in fluid communication with the first oxygen flow control means 42 and the piping 30 carrying the combustion air 28. Oxygen gas 40 is fed via piping 46 to the oxygen flow control means 42 and from the first flow control means 42 to the oxygen diffuser 44 or combustion air 28 piping 30. The first flow control means 42 and oxygen diffuser 44 ensure the desired amount of oxygen is injected into the combustion air 28 to prepare the oxygen-enriched combustion air 31.

The apparatus 10 further includes a second oxygen flow control means 50 (such as an oxygen flow skid 2) positioned between, and in fluid communication with, the source of oxygen 40 and one or a plurality of oxygen injectors 56 carrying pure oxygen 40 into the interior 16 of the furnace 12. Oxygen gas 40 is fed via piping 52 to the second oxygen flow control means 50 and from the flow control means 50 to the one or a plurality of oxygen injectors 56 via piping 54. The second flow control means 50 ensures the desired amount of oxygen is injected into the interior 16 of the housing 14 of the furnace 12.

Still referring to the FIGURE, the apparatus 10 includes $O_2$ sensors 62,68, each one of which senses an amount of $O_2$ in a corresponding one of the line 30 downstream of the $O_2$ diffuser 44 and an outlet side 20 of the housing 14, respectively. Each one of the $O_2$ sensors 62,68 generates a corresponding signal which is interpreted to understand if the amount of $O_2$ present in a line is in the correct range. For example, the $O_2$ sensor 62 is in communication with the line 30 downstream of an outlet of the $O_2$ diffuser 44 to sense that the combustion air in the line 30 has been sufficiently and correctly enriched with oxygen for the now oxygen-enriched combustion air to be used at the combustion air inlet 32. The $O_2$ sensor 62 generates a signal 64 and transmits the signal along a line 66, wirelessly or otherwise, to the $O_2$ flow skid 42 to either increase, decrease, or maintain the $O_2$ flow to the $O_2$ diffuser 44. There is typically a limit on the maximum oxygen concentration permitted in either the line 30 or the combustion air inlet 32 determined either by local operating codes and practice, the compatibilities of materials of construction with air enriched with oxygen, and/or the performance of the combustion equipment attached to the combustion air inlet 32. As such, there is a preferred limit for the 02 concentration in the oxygen-enriched air 31 in the line 30 downstream from the outlet of the $O_2$ diffuser 44. By way of example only and not limitation, an amount of $O_2$ in the line 30 downstream of the $O_2$ diffuser 44 is preferably set to not be above 23.5%. In conjunction therewith, the $O_2$ sensor 68 at the outlet side 20 of the housing 14 senses an amount of $O_2$ that is present at the outlet side 20 and which will be provided to the plant 60, The sensor 68 generates a signal 70 and transmits the signal along a line 72, wirelessly or otherwise, to the $O_2$ supply 40. If the signal 70 includes an $O_2$ percentage outside an acceptable range of, for example 2%-23.5% $O_2$ by volume, the $O_2$ flow skids 42 and 50 will be actuated to either increase or decrease the demand of $O_2$ from the $O_2$ supply 40. The $O_2$ flow skid 42, in conjunction with the $O_2$ sensor 62 and the signal 64 controls and limits the amount of $O_2$ provided to the $O_2$ diffuser 44 such that the 02 concentration in the oxygen-enriched air 31 remains at a preferred value below the permissible limit. Any $O_2$ demanded of the $O_2$ supply 40 by the signal 70 from the $O_2$ sensor 68 in excess of that delivered by the $O_2$ flow skid 42 into the oxygen-enriched air 31 is supplied from the $O_2$ flow skid 50 through the line 54 to one or the plurality of $O_2$ injectors 56.

The exit gas exiting the outlet side 20 of the furnace 12 is fed to a collection vessel 60 and collected for conversion of the sulfur dioxide in the exit gas to sulfuric acid. The collected exit gas is supplied to a suitable converter for converting the sulfur dioxide in the gas to sulfur trioxide and ultimately to produce sulfuric acid.

According to the disclosed embodiments of the process and the apparatus, controlled supply of oxygen is divided between a general oxygen enrichment in the combustion air supply and a separate oxygen enrichment by injection targeted at or near the periphery of the primary flame of one or more burners of the furnace.

According to the disclosed embodiments of the process and the apparatus, the capacity to oxidize sulfur-containing compounds from a stream in a single-stage spent acid recovery furnace is increased.

According to the disclosed embodiments of the process and the apparatus, the mass of combustion air that is introduced into the furnace is decreased by offsetting some of the combustion air with pure oxygen that is either blended with the remaining combustion air or injected directly into the furnace.

According to the disclosed embodiments of the process and the apparatus, the capacity of the furnace to recover sulfur dioxide from a spent sulfuric acid stream or other feed stream containing a sulfur-containing compound is increased by injecting targeted oxygen at, near, or into the periphery of the primary flame of one or more burners of the furnace.

The disclosed embodiments of the process and the apparatus provide the ability to control the local combustion conditions within the furnace by controlling the split of oxygen between the oxygen targeted directly around the periphery of the primary flame and the general oxygen enrichment of the oxygen-enriched combustion air.

The disclosed embodiments of the process and the apparatus provide the ability to control the local combustion conditions within the furnace by controlling the split of oxygen between the oxygen targeted directly around the periphery of the primary flame and the general oxygen enrichment of the oxygen-enriched combustion air which avoids localized overheating, as well as colder or fuel-rich zones in which some of the sulfur dioxide could be reduced to elemental sulfur.

According to the disclosed embodiments of the process and the apparatus, the production of sulfur dioxide is increased without increasing NOx emissions from the furnace or the pressure drop across the furnace.

Illustrative embodiments of the process for regenerating a spent acid stream or other acid precursor-containing stream of the present disclosure include:

In a first illustrative embodiment, provided is a process for decomposing at least one of a spent sulfuric acid stream or other sulfur-containing stream comprising: supplying at least one of the spent acid stream or the other sulfur-containing stream into a furnace; supplying oxygen-enriched combustion air into the furnace; supplying pure oxygen into the furnace; and oxidizing the at least one spent sulfuric acid stream or other sulfur-containing stream in the furnace.

According to a second illustrative embodiment of the process for decomposing a spent sulfuric acid stream or other sulfur-containing stream, provided is the process of the first illustrative embodiment, wherein the process further comprises introducing a combustion fuel to the furnace.

According to a third illustrative embodiment of the process for decomposing a spent sulfuric acid stream or other sulfur-containing stream, provided is the process of the first or second illustrative embodiments, comprising decomposing a spent sulfuric acid stream.

According to a fourth illustrative embodiment of the process for decomposing a spent sulfuric acid stream or other sulfur-containing stream, provided is the process of the first or second illustrative embodiments, comprising decomposing a sulfur-containing stream.

According to a fifth illustrative embodiment of the process for decomposing a spent sulfuric acid stream or other sulfuric-containing stream, provided is the process of any one of the first through fourth illustrative embodiments, wherein the step of supplying pure oxygen into the furnace comprises injecting the pure oxygen at or near the periphery of the primary flame of one or more burners of the furnace.

According to a sixth illustrative embodiment of the process for decomposing a spent sulfuric acid stream or other sulfuric-containing stream, provided is the process of any one of the first through fifth illustrative embodiments, wherein the oxygen-enriched combustion air is heated prior to the step of supplying the oxygen-enriched combustion air into the furnace.

According to a seventh illustrative embodiment of the process for decomposing a spent sulfuric acid stream or other sulfur-containing stream, provided is the process of any one of the first through sixth illustrative embodiments, wherein, prior to the step of supplying oxygen-enriched combustion air into the furnace, oxygen is injected into combustion air to prepare the oxygen-enriched combustion air.

According to an eighth illustrative embodiment of the process for decomposing a spent sulfur acid stream or other sulfur-containing stream, provided is the process of the seventh illustrative embodiment, wherein the oxygen is injected into at least one of (i) piping upstream of the heater for the combustion air, (ii) piping downstream of the heater for the combustion air, (iii) or into the heater for the combustion air, to prepare the oxygen-enriched combustion air.

According to a ninth illustrative embodiment of the process for decomposing a spent sulfuric acid stream or other sulfur-containing stream, provided is the process of any one of the first through eighth illustrative embodiments, wherein the pure oxygen is heated prior to the step of supplying the pure oxygen into the furnace.

According to a tenth illustrative embodiment of the process for decomposing a spent sulfuric acid stream or other sulfur-containing stream, provided is the process of any one of the first through ninth illustrative embodiments, wherein the oxygen-enriched combustion air and pure oxygen are supplied to the furnace though separate piping.

According to an eleventh illustrative embodiment of the process for decomposing a spent sulfuric acid stream or other sulfur-containing stream, provided is the process of any one of the first through tenth illustrative embodiments, wherein the pure oxygen is supplied to the furnace though at least one injector or injection location.

According to a twelfth illustrative embodiment of the process for decomposing a spent sulfuric acid stream or other sulfur-containing stream, provided is the process of any one of the second through eleventh illustrative embodiments, wherein the oxygen-enriched combustion air and fuel are supplied to the furnace though separate piping.

Illustrative embodiments of the apparatus for use in the process for regenerating a spent acid stream or other acid precursor-containing stream of the present disclosure include:

In a first illustrative embodiment, provided is an apparatus for use in a process for regenerating a spent sulfuric acid stream or other sulfur-containing stream, the apparatus comprising a decomposition furnace; an inlet for supplying at least one of the spent sulfuric acid feed or the other sulfur-containing stream into the decomposition furnace; an inlet for supplying a feed of an oxygen-enriched combustion air into the decomposition furnace; an inlet for supplying a pure oxygen feed into the decomposition furnace separately from the supplying of the oxygen-enriched combustion air; and an inlet for supplying a combustion fuel to the decomposition furnace.

According to a second illustrative embodiment, provided is an apparatus for use in a process for regenerating a spent sulfuric acid stream or other sulfur-containing stream of the first embodiment, wherein the apparatus further comprises a supply of at least one of the spent sulfuric acid or other sulfur-containing stream in fluid communication with the furnace.

According to a third illustrative embodiment, provided is an apparatus for use in a process for regenerating a spent sulfuric acid stream or other sulfur-containing stream of the first or second illustrative embodiments, wherein the apparatus comprises a supply of pure oxygen in fluid communication with the furnace.

According to a fourth illustrative embodiment, provided is an apparatus for use in a process for regenerating a spent sulfuric acid stream or other sulfur-containing stream of any one of the first through third illustrative embodiments, wherein the apparatus further comprises a supply of combustion air in fluid communication with the furnace.

According to a fifth illustrative embodiment, provided is an apparatus for use in a process for regenerating a spent sulfuric acid stream or other sulfur-containing stream of any one of the first through fourth illustrative embodiments, wherein the apparatus further comprises means to combine pure oxygen from the supply of pure oxygen with the combustion air.

According to a sixth illustrative embodiment, provided is an apparatus for use in a process for regenerating a spent sulfuric acid stream or other sulfur-containing stream of any one of the first through fifth illustrative embodiments, wherein the apparatus further comprises a supply of combustion fuel in fluid communication with the furnace.

Illustrative embodiments of the process for preparing sulfuric acid from a regenerated sulfuric acid stream or other sulfur-containing stream of the present disclosure include:

According to a first embodiment of the process for preparing sulfuric acid from a spent sulfuric acid stream or other sulfur-containing stream, provided is the process comprising supplying the spent sulfuric acid stream or the other sulfur-containing stream to a furnace; supplying oxygen-enriched combustion air into the furnace; separately supplying pure oxygen into the furnace; oxidizing the spent sulfuric acid stream or other sulfur-containing stream in the furnace; and converting the sulfur dioxide to sulfuric acid.

According to a second illustrative embodiment of the process for preparing sulfuric acid from sulfur dioxide recovered from a regenerated spent sulfuric acid stream or other sulfur-containing stream, provided is the process of the first embodiment for preparing sulfuric acid, wherein further comprising introducing a combustion fuel to the furnace.

According to a third illustrative embodiment of the process for preparing sulfuric acid from sulfur dioxide recovered from a regenerated spent sulfuric acid stream or other sulfur-containing stream, provided is the process of the first or second illustrative embodiments for preparing sulfuric acid, wherein the step of separately supplying pure oxygen into the furnace comprises injecting the pure oxygen at or near the periphery of the primary flame of one or more burners of the furnace.

According to a fourth illustrative embodiment of the process for preparing sulfuric acid from sulfur dioxide recovered from a regenerated spent sulfuric acid stream or other sulfur-containing stream, provided is the process of any one of the first through third illustrative embodiments for preparing sulfuric acid, wherein the oxygen-enriched combustion air is heated prior to the step of supplying the oxygen-enriched combustion air into the furnace.

According to a fifth illustrative embodiment of the process for preparing sulfuric acid from sulfur dioxide recovered from a regenerated spent sulfuric acid stream or other sulfur-containing stream, provided is the process of any one of the first through fourth illustrative embodiments for preparing sulfuric acid, wherein, prior to the step of supplying oxygen-enriched combustion air into the furnace, oxygen is injected into preheated combustion air to prepare the oxygen-enriched combustion air.

According to a sixth illustrative embodiment of the process for preparing sulfuric acid from sulfur dioxide recovered from a regenerated spent sulfuric acid stream or other sulfur-containing stream, provided is the process of any one of the first through fifth illustrative embodiments for preparing sulfuric acid, wherein the oxygen is injected at least one of (i) piping upstream of the heater for the combustion air, (ii) piping downstream of the heater for the combustion air, or (iii) into the heater for the combustion air to prepare the oxygen-enriched combustion air.

According to a seventh illustrative embodiment of the process for preparing sulfuric acid from sulfur dioxide recovered from a regenerated spent sulfuric acid stream or other sulfur-containing stream, provided is the process of any one of the first through sixth illustrative embodiments for preparing sulfuric acid, wherein the pure oxygen is heated prior to the step of supplying the pure oxygen into the furnace.

According to an eighth illustrative embodiment of the process for preparing sulfuric acid from sulfur dioxide recovered from a regenerated spent sulfuric acid stream or other sulfur-containing stream, provided is the process of any one of the first through seventh illustrative embodiments for preparing sulfuric acid, wherein the oxygen-enriched combustion air and pure oxygen are supplied to the furnace though separate piping.

According to a ninth illustrative embodiment of the process for preparing sulfuric acid from sulfur dioxide recovered from a regenerated spent sulfuric acid stream or other sulfur-containing stream, provided is the process of any one of the first through eighth illustrative embodiments for preparing sulfuric acid, wherein the pure oxygen is supplied to the furnace though at least one injector or injection location.

According to a tenth illustrative embodiment of the process for preparing sulfuric acid from sulfur dioxide recovered from a regenerated spent sulfuric acid stream or other sulfur-containing stream, provided is the process of any one of the first through ninth illustrative embodiments for preparing sulfuric acid, wherein the oxygen-enriched combustion air and fuel are supplied to the furnace though separate piping.

According to another illustrative embodiment of the process for decomposing at least one of a spent sulfuric acid stream or other sulfur-containing stream, there is provided sensing an amount of oxygen both in the oxygen-enriched combustion air supplied to the furnace and at an outlet stream from the furnace; and adjusting the amount of oxygen supplied as necessary for the oxygen-enriched combustion air.

According to still another illustrative embodiment of the apparatus for regenerating at least one of a spent sulfuric acid stream or other sulfur-containing stream, there is provided a first sensor for sensing a first amount of oxygen in the oxygen-enriched combustion air and generating a first signal representing the first amount of oxygen; a second sensor for sensing a second amount of oxygen in an outlet stream from the decomposition furnace and generating a second signal representing the second amount of oxygen; wherein the first and second amounts of oxygen sensed determine an amount of oxygen to be present in the oxygen-enriched combustion air supplied into the decomposition furnace.

It will be understood that the embodiments described herein are merely exemplary, and that a person skilled in the art may make variations and modifications without departing from the spirit and scope of the invention. All such variations and modifications are intended to be included within the scope of the invention as provided in the appended claims. It should be understood that the embodiments described above are not only in the alternative but can be combined.

What is claimed is:

1. A process for decomposing at least one of a spent sulfuric acid stream or other sulfur-containing stream, comprising:

supplying at least one of the spent sulfuric acid stream or the other sulfur-containing stream into a furnace;

supplying oxygen-enriched combustion air into the furnace;

separately supplying pure oxygen into the furnace;

supplying a combustion fuel to the furnace;

decomposing the at least one spent sulfuric acid stream or other sulfur-containing stream in the furnace;

sensing an amount of oxygen both in the oxygen-enriched combustion air supplied to the furnace and at an outlet stream from the furnace; and adjusting the amount of oxygen supplied to the oxygen-enriched combustion air as necessary for decomposing the at least one spent sulfuric acid stream or other sulfur-containing stream in the furnace.

2. The process of claim 1, comprising decomposing the spent sulfuric acid stream.

3. The process of claim 1, comprising decomposing the at least one other sulfur-containing stream.

4. The process of claim 1, comprising decomposing both the spent sulfuric acid stream and the other sulfur-containing stream.

5. The process of claim 2, wherein the separately supplying pure oxygen into the furnace comprises injecting the pure oxygen at or near a periphery of a primary flame of one or more burners of the furnace.

6. The process of claim 5, wherein the oxygen-enriched combustion air is heated prior to the supplying the oxygen-enriched combustion air into the furnace.

7. The process of claim 6, wherein prior to the supplying oxygen-enriched combustion air into the furnace, oxygen is injected into combustion air for preparing the oxygen-enriched combustion air.

8. The process of claim 5, wherein the pure oxygen is heated prior to the supplying the pure oxygen into the furnace.

9. The process of claim 1, wherein the oxygen-enriched combustion air and the pure oxygen are supplied to the furnace through separate piping.

10. The process of claim 1, wherein the supplying pure oxygen is to the furnace through one or a plurality of injectors.

11. The process of claim 10, wherein a proportion of oxygen delivered to the enriched air stream and to the one or plurality of injectors is determined based on either a measured temperature proximate a flame, or a theoretical adiabatic temperature of a fuel/air/oxygen mixture delivered through burners.

12. The process of claim 1, wherein the supplying the oxygen-enriched combustion air and the combustion fuel are to the furnace through separate piping.

* * * * *